(12) United States Patent
Vonbank et al.

(10) Patent No.: US 6,202,103 B1
(45) Date of Patent: Mar. 13, 2001

(54) BUS DATA ANALYZER INCLUDING A MODULAR BUS INTERFACE

(75) Inventors: Michael Vonbank, Scottsdale; Andreas Schloissnik; Peter W. Scharf, both of Phoenix; Dennis C. Dumroese, Scottsdale, all of AZ (US)

(73) Assignee: 3A International, Inc., Tempe, AZ (US)

( * ) Notice: Subject to any disclaimer, the term of this patent is extended or adjusted under 35 U.S.C. 154(b) by 0 days.

(21) Appl. No.: 09/197,862

(22) Filed: Nov. 23, 1998

(51) Int. Cl.[7] .................................................. G06F 13/00
(52) U.S. Cl. .............................. 710/15; 710/129; 714/39
(58) Field of Search ..................... 710/15–19, 101–104, 710/129–131; 713/600; 714/31, 33, 37–57, 733, 742; 370/241–242, 394; 395/129, 183.2; 314/184

(56) References Cited

U.S. PATENT DOCUMENTS

| | | | |
|---|---|---|---|
| 5,509,126 | 4/1996 | Oprescu et al. | 710/129 |
| 5,612,958 * | 3/1997 | Sannino | 370/394 |
| 5,621,312 * | 4/1997 | Achor et al. | 324/158.1 |
| 5,644,707 * | 7/1997 | Chen | 714/57 |
| 5,652,832 | 7/1997 | Kane et al. | 714/2 |
| 5,657,442 * | 8/1997 | Groves | 395/129 |
| 5,724,517 | 3/1998 | Cook et al. | 709/227 |
| 5,740,387 | 4/1998 | Lambrecht et al. | 710/129 |
| 5,778,194 * | 7/1998 | McCombs | 713/600 |
| 5,778,204 | 7/1998 | Van Brunt et al. | 710/128 |
| 5,781,434 * | 7/1998 | Swain | 364/184 |
| 5,784,576 | 6/1998 | Guthrie et al. | 710/103 |
| 5,790,815 | 8/1998 | Swanstrom et al. | 710/129 |
| 5,848,236 * | 12/1998 | Dearth et al. | 714/33 |
| 5,880,936 * | 3/1999 | Anderson | 361/752 |
| 5,966,510 * | 10/1999 | Carbonneau et al. | 395/183.2 |
| 6,044,476 * | 3/2000 | Ote et al. | 714/31 |
| 6,119,168 * | 9/2000 | Hashimoto et al. | 709/238 |

FOREIGN PATENT DOCUMENTS

| | | |
|---|---|---|
| 41141325 * | 2/1999 | (JP) . |
| 11196156 * | 7/1999 | (JP) . |
| 11308259 * | 11/1999 | (JP) . |
| 9819422 * | 5/1998 | (WO) . |

OTHER PUBLICATIONS

3A International, Inc. Brochure "1394 Data Analyzer".

* cited by examiner

*Primary Examiner*—Christopher B. Shin
(74) *Attorney, Agent, or Firm*—Schmeiser, Olsen & Watts; S. Jared Pitts (57) ABSTRACT

The preferred embodiment of the present invention provides a data analyzer with a modular bus interface that provides increased flexibility over prior art designs. The modular bus interface allows physical layer devices to be easily swapped, allowing a wide variety of link layer and physical layer device combinations to be tested while minimizing system downtime. In the preferred embodiment, the link layer devices are mounted onto an expansion card that includes a releasable connector. Physical layer devices are mounted onto cards that can plug into the releasable connector. The releasable connector provides the electrical and mechanical connection between the link layer device and the physical layer device, and allows different link layer and physical layer devices to be tested together. By including such a modular bus interface, the preferred embodiment data analyzer provides increased flexibility and performance over prior art systems.

32 Claims, 4 Drawing Sheets

BUS DATA ANALYZER INCLUDING A MODULAR BUS INTERFACE

BACKGROUND OF THE INVENTION

1. Technical Field

This invention generally relates to data analyzers and more specifically relates data analyzers used to monitor bus traffic.

2. Background Art

Computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical Personal Computer may run the Windows operating system, and under the control of the Windows operating system, a user may execute an application program, such as a word processor.

Computer systems also include a bus system that is a transmission path on which signals are dropped off or picked up at every attached device. These bus systems generally include an internal bus that connects all the internal computer components to the processor to the main memory, and an expansion bus that enables expansion boards to access the processor and memory. Most modern personal computers also include a local bus that provides a high speed path for video data. Computers also typically include one or more serial ports and one or more parallel ports. The serial ports can be used as a general-purpose interface for almost any type of device, including modems and mice. Parallel ports are commonly used for scanners, printers and other peripherals that require more data throughput.

Recently, computers and other consumer electronics have begun to include new, very fast external bus standard that supports data transfer rates of up to 400 Mbps (400 million bits per second). This bus, typically referred to as the 1394 bus (for the IEEE 1394 standard that defines it) or by the trademarked name FireWire, offers significant improvement over previous external bus designs. For example, a single 1394 port can be used to connect up 63 external devices. In addition to its high speed, 1394 bus also supports isochronous data—delivering data at a guaranteed rate. This makes it ideal for devices that need to transfer high levels of data in real-time, such as video devices. 1394 buses also support both Plug-and-Play and hot plugging, and also provide power to peripheral devices. IEEE 1394 is expected to be used mostly for devices that require large throughput, such as video cameras, scanners, printers, and storage devices.

The IEEE 1394 bus is typically implemented using two chips, a link layer chip and a physical layer chip (generally referred to as a PHY). These two chips together provide the 1394 bus hardware requirements. The link layer chip formats the data into packets. The PHY chip has the physical signaling circuits and logic that are responsible for power-up, initialization, arbitration, bus-reset sensing and data signaling.

Unfortunately, there has been some difficulty in consistently implementing the 1394 bus. In particular, incompatibility between different implementations of the physical layer and link layer chips from different vendors has led to compliance and interoperability problems that are slowing down the further growth of this technology.

Bus data analyzers are tools used to monitor bus traffic to facilitate development and testing of bus systems. For example, developers use data analyzers to monitor buses in order to optimize performance and functionality of the bus. Common tools for this task are data analyzers that have passive bus snooping capability on one hand but are capable of simulating the bus by active data generation on the other hand. Hence, these instruments typically perform a variety of functions, including data capturing, data generation, protocol analysis and event identification. Unfortunately, the flexibility of these data analyzers to work with different bus implementations is limited. In particular, there has been no easy way to test the influence of different combinations of bus chip sets on a device communicating with the bus.

Therefore, without a more flexible and efficient mechanism for analyzing bus traffic data, the task of testing specific devices with multiple bus implementations will continue to be very cumbersome and difficult.

SUMMARY OF THE INVENTION

The preferred embodiment of the present invention provides a data analyzer with a modular bus interface that provides increased flexibility over prior art designs. The modular bus interface allows physical layer devices to be easily swapped, allowing a wide variety of link layer and physical layer device combinations to be tested while minimizing system downtime. In the preferred embodiment, the link layer devices are mounted onto an expansion card that includes a releasable connector. Physical layer devices are mounted onto cards that can plug into the releasable connector. The releasable connector provides the electrical and mechanical connection between the link layer device and the physical layer device, and allows different link layer and physical layer devices to be tested together. By including such a modular bus interface, the preferred embodiment data analyzer provides increased flexibility and performance over prior art systems.

Thus, the preferred embodiment provides a highly flexible, modular measurement device by separating link layer and physical layer device, and locating each on different modular entities. In particular, the preferred embodiment provides physical layer module in which chips from different manufacturers can be used without changing the entire bus interface, allowing the effects of different chip combinations on bus devices to be more easily evaluated. Furthermore, the preferred embodiment uses active data generation capabilities in order to test device performance when stimulated via a multi-vendor bus interface.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates in general to bus data analyzers and to IEEE 1394 serial buses. For those individuals who are not generally familiar with data analyzers and the IEEE 1394 bus, the Overview section below presents many of the basic concepts and terminology that will help to understand the invention. Individuals skilled in the art of the IEEE 1394 serial bus and data analyzers may wish to skip this section and proceed directly to the Detailed Description section of this specification.

1. Overview

IEEE 1394 Serial Bus

Recently, computers and other consumer electronics have begun to include a new, very fast serial bus standard. This bus, typically referred to as the 1394 bus (for the IEEE 1394 standard that defines it) or by the trademarked name FireWire, offers significant improvement over previous external bus designs. For example, 1394 buses currently support data transfer rates of 100, 200 and 400 Mbps (megabits per second) and will support rates of up to 3.2 Gbps (gigabits per second) in the future. Furthermore, the 1394 bus can be implemented at reduced costs when compared to similarly performing parallel buses. Because of the high speed and low cost, more and more devices are using the 1394 bus.

The 1394 bus supports both asynchronous and isochronous data transfers. Asynchronous data transfers are for applications that require transfer without any data corruption. For this type of transfer, the IEEE 1394 bus provides data verification of valid data delivery across the serial bus, as well as confirmation back to the initiator that the transfer was successfully received by the application. If the data was not received, the failure is reported to the initiator of the transfer, which can then initiate the transfer again.

Isochronous data transfers are for applications that require data delivery at a guaranteed rate, and do not require confirmation of data delivery. For example, audio and video data generally has a short life and it is acceptable to miss single data transmissions. Thus, the 1394 bus is ideal for devices that transfer high levels of data in real-time, such as audio and video transfer. The isochronous transfer support reduces the amount of buffering required by such isochronous applications, reducing the cost of implementation.

Devices attached to the IEEE 1394 serial bus support automatic configuration. Each 1394 node that attaches to the bus automatically participates in the configuration process without requiring intervention from the host system. Thus, 1394 buses support both Plug-and-Play and hot plugging.

The IEEE 1394 bus supports bus mastering and has the ability to increase overall system performance in a PC environment by reducing traffic across the computer's main bus and by reducing accesses to the memory subsystem. This can be accomplished by locating devices on the 1394 bus that communicate with each other frequently, eliminating the need for the processor and memory subsystems to to be involved in the transfer of data between devices.

IEEE 1394 buses can support up to 64 node addresses on a single serial bus implementation, with each of the 64 nodes having a 256 terabyte address space. This large address space makes the 1394 bus an efficient way to bridge between different host systems and between multiple serial bus implementations. In particular, a single 1394 bus will be able to bridge up to 1024 serial buses in the future.

These and other advantages have led to considerable interest in using the 1394 bus in a wide variety of applications, from consumer electronics such as video cameras to mass storage for computers. In this application, the term 1394 device is meant to include any device that contains a 1394 interface such that it can be connected to a 1394 bus. Examples of 1394 devices include cameras, printers, scanners, 1394 bus adapter cards, 1394 cable boosters, etc.

Four protocol layers are defined to simplify the implementation of hardware and software to support the 1394 bus. Each layer has a set of services defined to support communication between an application and the 1394 bus. These layers include: a bus management layer that supports bus configuration and management activities for each node; a transaction layer that supports the request-response protocol for read, write and lock operations related to asynchronous transfer; a link layer that provides the translation of a transaction layer request or response into a corresponding packet or subaction; and a physical layer that provides the electrical and mechanical interface required for transmission and reception of data transferred across the serial bus and provides arbitration to ensure that only one node at a time transfers data across the bus.

The bus management layer and transaction layer are typically implemented in software, and the link layer and physical layer are typically implemented in using two separate chips; a link layer device and a physical layer device (generally referred to as a PHY).

The IEEE 1394 standard describes the interface between the link layer and PHY chips. In particular, the specification requires an interface between the two chips that includes eight data lines, two control lines, a clock line, a link power status line, and a link-on line.

The control lines provide bidirectional control signals that specify the type of transmission being made, i.e., whether the link layer or PHY is transmitting the data. The PHY is the default owner of the PHY/Link layer interface and the link layer gains ownership of the interface via the link request line. Thus, when the link wants to transfer a packet to the PHY it asserts the link request line to gain ownership of the interface, and sends the packet over the data lines. The PHY then transmit the packet over the 1394 cable. Depending on the speed of data transmission, 2 (for 100 Mbps), 4 (for 200 Mbps) or all 8 (for 400 Mbps) data lines are used. Ownership of the PHY/link interface returns to the PHY after the link has completed sending the packet.

The data signals are used by the link layer device and the PHY for transferring data across the interface. Thus, these two implementation chips together provide the 1394 bus functionality. The link layer chip formats the data into packets. The PHY chip has the physical signaling circuits and logic that are responsible for power-up, initialization, arbitration, bus-reset sensing and data signaling.

Data Analyzers

Data analyzers are specialized measurement devices designed to test and debug electronic systems. One type of data analyzer is used to monitor traffic along serial buses.

These buses provide a transmission path on which signals are dropped off or picked up at every attached device. Most modem computer systems generally include an internal bus that connects all the internal computer components to the processor and main memory, and an expansion bus that enables expansion boards to access the processor and memory. Additionally peripheral buses allow a designer to connect these devices to other devices to test data exchange between multiple devices. One new type of bus that provides increased performance and ease of use is the IEEE 1394 serial bus described above. All of these buses work to transmit data to various connected devices.

Bus data analyzers are tools used to monitor bus traffic to facilitate development and testing of bus systems. Bus data analyzers for IEEE 1394 buses provide a wide range of diagnostic tools for testing IEEE 1394 buses. For example, 1394 bus data analyzers provide full asynchronous and isochronous capturing capabilities making them capable measurement tools for 1394 protocol analysis, traffic monitoring and event identification. Together with timing analysis, bandwidth analysis and higher level protocol analysis, they provide the tools needed for a IEEE 1394 design team to fully implement and test a bus design.

In particular, state-of-the-art 1394 data analyzers utilize passive bus snooping technology, allowing it to listen to any bus activity without interfering with regular bus traffic. Furthermore, the data analyzer provides the ability to log every event (both asynchronous and isochronous) into a buffer for off-line analysis. Predefined packets or previously captured sequences of packets can be commonly used to stimulate the bus using an active data generation capability.

Higher level software layers can provide a dynamic visual representation of the 1394 system architecture currently being tested. This visual representation provides an easy to understand topology map that reflects live cable insertion, control status register architecture information and speed mapping of the 1394 system.

One limitation on current 1394 bus data analyzers is that it is difficult to test with different combinations of link layer and physical layer chip sets. For example, developers generally need to test their 1394 devices, such as a cameras, TVs, scanners, etc., with as many different bus implementations as possible to assure consistent operation. Current data analyzers do not provide an easy way to test 1394 devices with different combinations of bus implementations. In particular, if a 1394 developer needs to test a 1394 device with many different PHY-link layer combinations, host adapter cards for each combination must be provided. Purchasing multiple cards can add significant expense. Furthermore, many combinations may not be readily available, requiring an even more costly custom design.

Additionally, the data analyzer may need to be reconfigured each time a new host adapter card with a different PHY-link layer combination is installed. This can result in significant downtime. To avoid this, a 1394 developer may instead attempt to test the 1394 device with these different PHY-link combinations by installing additional 1394 nodes having these combinations on the test bus. While this avoids having to reconfigure the data analyzer, this causes the system under test to become rather large, adding another problem to the test platform.

2. Detailed Description

The preferred embodiment of the present invention provides a data analyzer with a modular bus interface that provides increased flexibility over prior art designs. The modular bus interface allows physical layer devices to be easily swapped, allowing a wide variety of link layer and physical layer device combinations to be tested while minimizing system downtime. In the preferred embodiment, the link layer devices are mounted onto a modular bus interface that includes a releasable connector. Physical layer devices are mounted onto a physical layer module that plugs into the releasable connector. The releasable connector provides the electrical and mechanical connection between the link layer device and the physical layer device. By including such a modular bus interface, the preferred embodiment data analyzer provides increased flexibility and performance over prior art systems.

Figure 1:
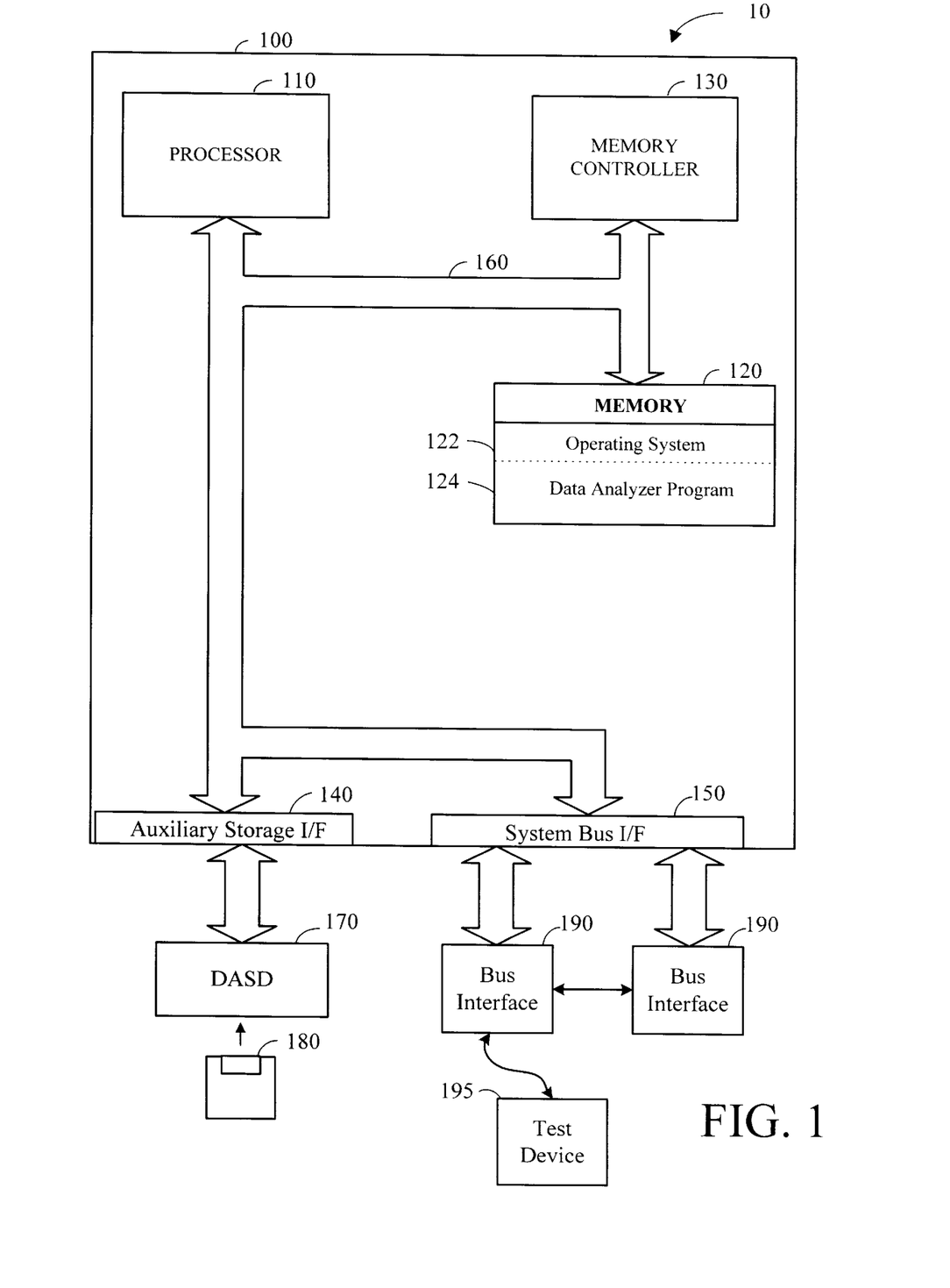
FIG. 1 is a block diagram of a data analyzer system according to a preferred embodiment of the present invention.

Referring now to FIG. 1, a data analyzer 10 in accordance with a preferred embodiment of the present invention is preferably implemented using a standard IBM compatible computer system 100. However, those skilled in the art will appreciate that the method and apparatus of the present invention could be implemented with any suitable computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a system bus 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes computer programs within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system implementing a data analyzer, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

In the preferred embodiment, memory 120 suitably includes an operating system 122 and a data analyzer program 124. The operating system controls the basic operation of computer system 100 and can comprise any suitable operating system such as Windows, Windows NT, OS/2, and Unix. The data analyzer program 124 preferably includes low level programs to control the low level operation of the data analyzer and high level programs to perform system analysis. The low level programs initialize the physical layer and link layer devices and control their registers for basic capturing and data generation. Furthermore, the low level programs handle all trigger mechanisms during data snooping as well as bus event monitoring, e.g. bus reset indication. When needed, they are also responsible for updating the Topology Map and the Speed Map. The high level system programs handle data management and data analysis and provide 1394 system services like bus management, isochronous resource management as well as cycle master management. Furthermore, the high level system program provides extended system analysis features like CSR (control status register) and ConfigROM verification, bandwidth analysis, device recognition and scripting support for automated operation of the data analyzer. All of the functionality of the data analyzer programs can be easily access and controlled through an graphical user interface (GUI).

It should be understood that for purposes of this application, memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

The elements of computer system 100 are connected using system bus 160. System bus 160 preferably comprises a high speed peripheral interconnect (PCI) bus that is commonly available, but can also comprise other suitable buses, such as PCI-X, PC 104, ISA, MCA, NuBus, MVE, etc. Furthermore, although the computer system 100 depicted in FIG. I contains only a single main processor 110 and a single system bus 160, it should be understood that the present invention applies equally to computer systems having multiple processors and multiple system buses. Thus, although the system bus 160 of the preferred embodiment is a PCI bus, any connection means that supports directional communication in a computer-related environment could be used.

System bus interface 150 is used to connect peripheral components to the computer system. In the preferred embodiment, system bus interface 150 comprises a PCI expansion bus interface that allows a plurality of PCI expansion cards to be connected to computer system 100. Of course, another suitable interface can be used. Two bus interfaces 190 are connected to the computer system 100 through the system bus interface. In the preferred embodiment, these bus interfaces 190 are implemented as PCI expansion cards, allowing them to interface with the system bus 160 using the standard PCI expansion interface. It should be understood that in this application the term "PCI" is meant to include all present and future variations of the PCI bus, including CompactPCI, PCI-X, PC-104+, etc.

In the preferred embodiment, each bus interface 190 implements the bus that is to be tested and analyzed using the data analyzer 10. Furthermore, in the preferred embodiment, each bus interface 190 implements an IEEE 1394 high speed serial bus. It should be understood that in this application the term "1394" is meant to include all present and future variations and of the IEEE 1394 bus, including 1394a, 1394b, etc. However, it should be also understood that the present invention can also be applied to test other types of buses as needed. For example, other serial buses like Ethernet, Universal Serial Bus (USB) and Fibre Channel use separate physical layer and link layer devices to implement the actual interface. The preferred embodiment of the present invention can be applied to data analyzers for these and other buses, providing many of the same advantages to these other bus platforms. As will be explained in more detail later, at least one of the bus interfaces 190 preferably comprises a modular bus interface implemented in accordance with the preferred embodiment.

While in the preferred embodiment, the data analyzer includes two IEEE 1394 bus interfaces 190, it can also be implemented using a single 1394 bus interface 190. With a single bus interface the data analyzer can snoop data provided by other connected 1394 devices (e.g., scanners, cameras, etc), such as test device 195. Adding a second 1394 bus interface 190 allows the data analyzer to generate additional test data along with any connected 1394 devices. Thus, in the most preferred embodiment two IEEE 1394 bus interfaces 190 are provided, with one bus interface 190 serving to generate data and the other bus interface 190 serving to snoop data. Of course, the role of the two bus interfaces 190 can be switched as needed. This allows for connected 1394 devices to be tested with a wide variety of bus implementations. Additionally, in the preferred embodiment the 1394 bus interface 190 used for snooping is set in the PCI bus master mode, while the 1394 bus interface 190 used for data generation is set in PCI bus slave mode. This gives the snooping bus interface 190 priority, assuring that it can snoop all data generated by the data generation bus interface 190 and any connected devices. The two 1394 bus interfaces 190 are preferably connected using internal 1394 connectors. This allows the two bus interfaces to communicate to facilitate testing. Furthermore, each bus interface 190 also preferably includes an additional external connector that can be used to connect external 1394 devices, providing increased testing flexibility.

The two IEEE 1394 bus interfaces 190 preferably interact with the data analyzer using direct memory accessing. This provides sufficient bandwidth to generate, transmit, monitor and store the test data sent across the test 1394 bus.

In accordance with the preferred embodiment, at least one of the bus interfaces 190 used in the data analyzer comprises a modular bus interface.

Figure 2:
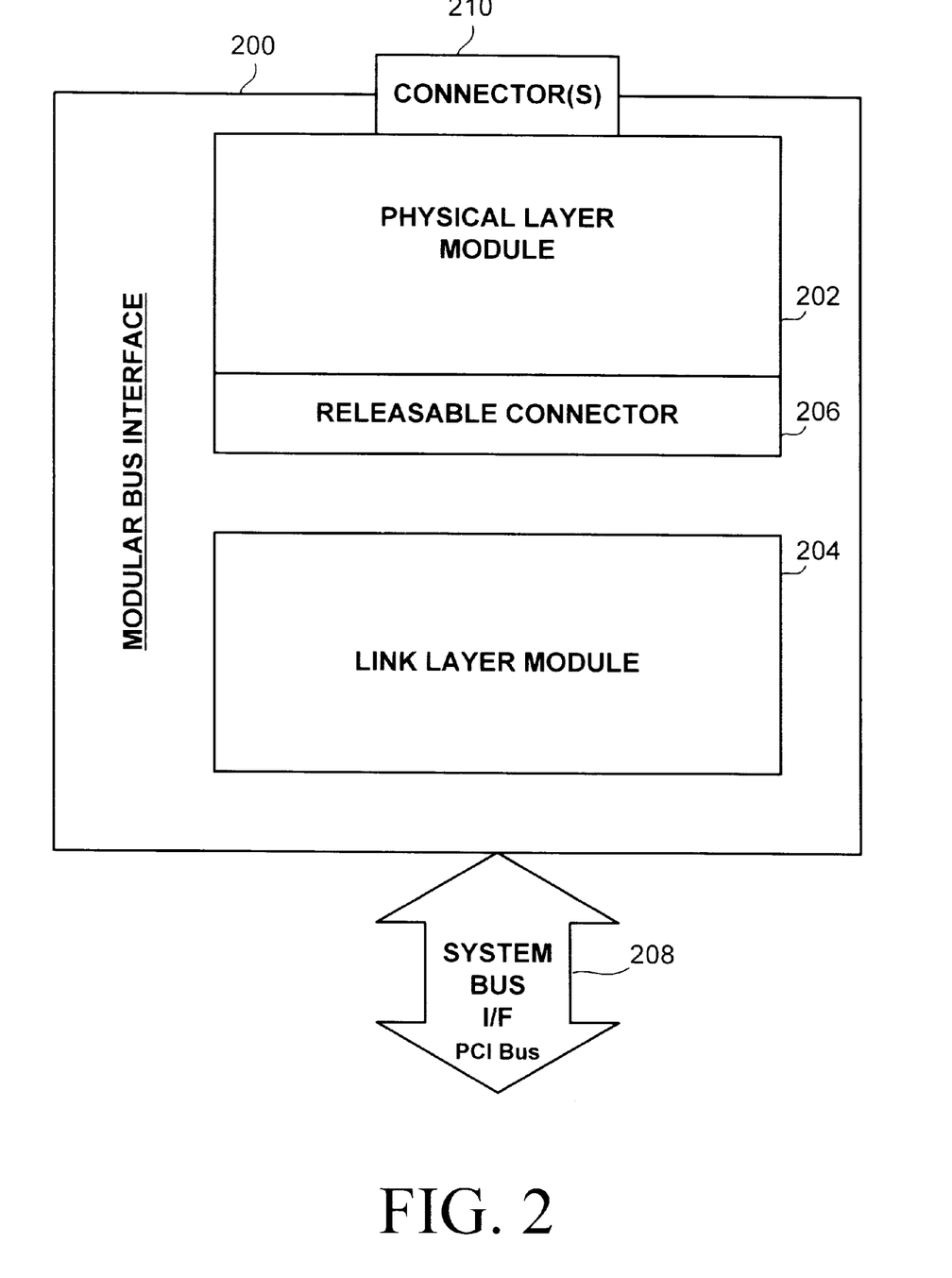
FIG. 2 is a block diagram illustrating modular bus interface in accordance with the preferred embodiment.

Referring now to FIG. 2, a modular bus interface 200 in accordance with the preferred embodiment is illustrated in more detail. The modular bus interface 200 can be used as either one or both of the bus interfaces 190 illustrated in FIG. 1.

The modular bus interface 200 includes a physical layer module 202, a link layer module 204, a releasable connector 206, a system bus interface 208 and connector(s) 210. The modular bus interface 200 is implemented to facilitate easy swapping of different physical layer modules 202 on the modular bus interface 200.

The link layer module 204 preferably include the devices(s) used to format data into packets for transmission by the physical layer devices. Physical layer module 202 preferably includes the device(s) used to provide the physical signaling over the bus. Thus, where the preferred embodiment is used to test IEEE 1394 serial buses, the link layer module 204 preferably includes a 1394 link layer device and the physical interface module 202 preferably includes a 1394 PHY device. Likewise, where the preferred embodiment is adapted to test USB buses the link layer module 204 would include a USB link layer device and the physical interface module 202 would include a USB physical layer device.

In the preferred embodiment, the modular bus interface 200 is implemented as a PCI expansion card, and the system bus interface 208 thus comprises a PCI expansion card interface. It should be understood that in this application the term "PCI expansion card" is meant to include all present and future variations of PCI expansion cards, including CompactPCI, PCI-X, PC104+,etc. This allows the modular bus interface 200 to be connected to a computer that includes PCI expansion card slots. Of course, other suitable form factors could be used, including other expansion card formats such as ISA, etc.

The physical layer module 202 is preferably implemented to allow different physical layer modules 202 to be easily swapped on the modular bus interface 200. The link layer module 204 is preferable integrated onto the PCI expansion card, although it could also be implemented on a easily removable device to facilitate swapping on the modular bus interface 200.

In particular, in the preferred embodiment, the physical layer module 202 is implemented on a PC Card type card, as defined by the Personal Computer Memory Card International Association (PCMCIA). It should be understood that the term PC Card in this application is meant to include all present and future variations, include type I, II, and III cards, small PC Card, etc. Likewise, the releasable connector 206 preferably comprises a PC Card type socket, again as defined by PCMCIA, with the PC Card type socket mounted a PCI expansion card. Thus, different physical layer modules 202 can be easily swapped on the modular bus interface. Of course, the physical layer module 202 can be implemented using form factors other than the PC Card type. For example, the physical layer module 202 can be implemented using any type of printed circuit board or other electronic case.

Furthermore, it should be noted that the preferred embodiment uses the PC Card form factor only to provide the needed electrical and mechanical connections between the physical layer module 202 and the modular bus interface. Thus, the actual pin assignments on the PC Card type socket interface do not need to conform to the PCMCIA standard for regular PC Card devices. Of course, the PC Card type socket is only one type of releasable connector that could be utilized to facilitate the present invention. In particular, the releasable connector 206 can comprise any type of plug or connector that includes sufficient pins and allows the physical layer device module to easily swapped. For example, edge card connectors, other bus connectors, memory storage connectors, flex card systems, microbay system, etc.

The modular bus interface 200 also includes a plurality of bus connectors 210. The bus connectors 210 provide the connection to the bus that is being tested by the data analyzer. Thus, in the preferred embodiment these connectors comprises IEEE 1394 compatible connectors. Furthermore, in the preferred embodiment at least one connector is formed on the physical layer module 202, and at least one other connector is formed on the modular bus interface itself, with the connections between these two connectors also running between the module interface 206. It should be noted that the IEEE 1394 standard allows up to 16 connectors to attached to one IEEE 1394 PHY chip, although most current implementations only provide for three connectors.

Figure 3:
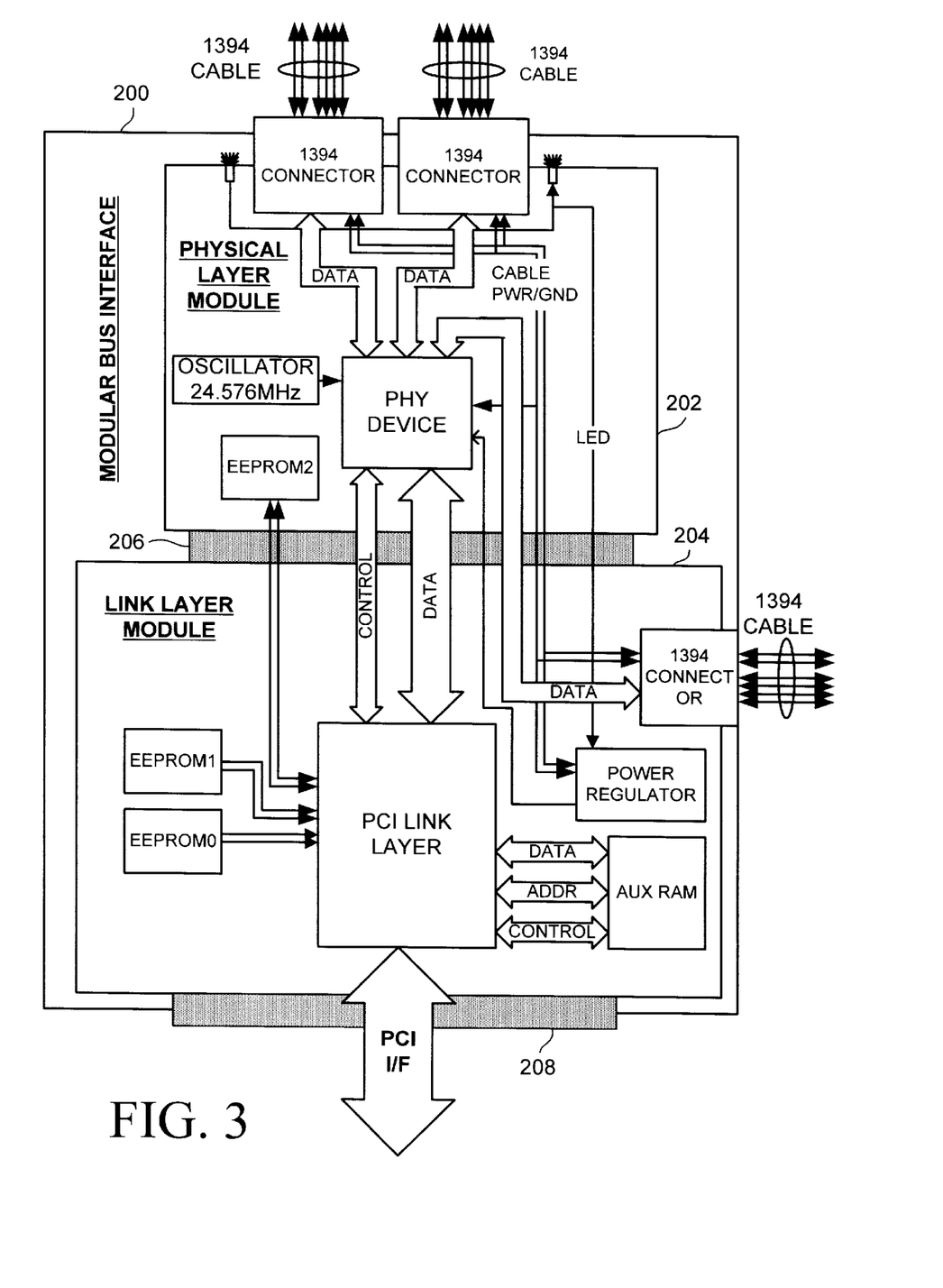
FIG. 3 is a schematic representation of an modular bus interface for an IEEE 1394 bus.

Turning now to FIG. 3, the preferred implementation of a modular bus interface 200 for the IEEE 1394 bus is illustrated in more detail. The modular bus interface 200 again includes a physical layer module 202 and a link layer module 204. The physical layer module 202 includes a PHY chip, two 1394 connectors, an oscillator, and EEPROM and the connections between those devices. The link layer module 204 includes a PCI Link Layer device, a power regulator, a 1394 connector, auxiliary RAM, two EEPROM and the connections between those devices. Again, in accordance with the preferred embodiments, the physical layer module 202 is implemented onto a PC Card type card, while the link layer module 204 is integrated onto a PCI type expansion card. The physical and electrical connection between the physical layer module 202 and the link layer module 204 is provided by a releasable connector 206 mounted on the modular bus interface. Again, the releasable connector 206 preferable comprises a PC Card type socket. The modular bus interface 202 then connects to the data analyzer computer through PCI system bus interface 208.

In the embodiment illustrated in FIG. 3, the link layer module 204 includes a PCI link layer device. These devices are designed to include the 1394 link layer functionality integrated with a PCI interface controller. Other link layer devices do not include this built in functionality. For these link layer devices, a PCI interface controller would typically need to be included on the link layer module 204 in addition to the IEEE 1394 link layer device.

The modular bus interface 200 illustrated in FIG. 3 includes several features used to fully implement the IEEE 1394 bus. These include a power regulator to provide required power and an auxiliary RAM used to store control programs and/or data as needed. Also included on the modular bus interface 200 are three Electrically Erasable Programable Read-Only Memories (EEPROM), EEPROM0 and EEPROM1 on the PCI host card and EEPROM2 on the physical layer module. In the preferred embodiment EEPROM0 includes the node's configuration ROM (ConfigROM), which includes the Global Unique Identifier (GUID), node capabilities, and device discovery information.

Also preferably included in EEPROM0 is an encryption key used to verify whether this is an authorized use of the modular bus interface 200. This verification is facilitated by storing an encrypted key in the image stored on EEPROM1 and module identification data in the image stored on EEPROM2. When a new physical layer module is coupled to the modular bus interface, the image is retrieved from EEPROM0. From this image, a key is extracted. That key can then be used to decrypt the image stored on EEPROM1. The decrypted EEPROM1 image generates a second key. This second key can then be used to decrypt the EEPROM2 image stored on the physical layer module. With the EEPROM2 image decrypted, the module authentication data is retrieved, and the module authenticated as correct. If this authentication is correct, the data analyzer system software can check for proper registration. In this way, the preferred embodiment implementation provides for reliable device authentication and security to prevent unauthorized and unwanted use.

There are several design considerations that should be taken into account when designing and implementing the releasable connector 206 between physical layer module 202 and the modular bus interface 200. As stated before the preferred embodiment uses a PC Card type socket to provide the electrical and mechanical connection, but with a specialized pin layout. It is preferable that the pin layout of this interface be designed such no damage would occur if a regular PC Card was inadvertently connected to the releasable connector 206. Likewise, it is preferable that the pin layout be designed such that no damage would occur if a physical layer module 202 was inadvertently placed in a regular PC Card socket.

The pin layout of the releasable connector 206 should also be selected to minimize interference between the various lines. The 8-bit parallel PHY-link layer interface is synchronized by a 49.152 MHZ reference clock. This high speed interface can cause electromagnetic interference and radio frequency interference emission problems. The effects of this interference should be minimized using known techniques for designing circuit boards for high speed applications. Generally it is desirable to keep the traces running to the releasable connector as short as possible. Adequate ground plain and adjacent ground traces will provide the necessary shielding. An additional issue, crosstalk, can be reduced by placing grounded traces between high speed signal lines and/or placing critical connections on pins located at opposite sides of the releasable connector 206. Therefore, the pin layout of the releasable connector 206 should be selected to minimize interference between the various lines.

Furthermore, the controlled impedance requirements of the modular bus interface 200 and the physical layer module 202 should be accounted for when designing the releasable connector 206. As an additional consideration, attention should be give to compatibility between the various chosen physical layer devices that will be used.

To fully implement the physical layer module 202, all the interface lines between the PHY chip and the link layer chip need to run through the releasable connector 206. Again, for a IEEE 1394 bus these interface lines would include eight data lines, two control lines, a clock line, a link power status line, a direct line, and a link-on line. The control lines provide bi-directional control signals that specify the type and direction of the transmission being made, i.e., whether the link layer or PHY is transmitting the data and what bandwidth is being used. The data signals are used by the link layer device and the PHY for transferring data across the interface.

The other lines control provide additional signals and control. For example, PHY voltage set lines are also run through the interface to provide PHY voltage feedback. This allows the power regulator to determine the voltage required for the PHY (typically 3.3 V or 5 V). Additionally, module detection lines are preferably run though the interface to generate interrupts for higher level software notification of physical layer module swapping events.

In addition to these PHY-link layer interface lines, it is also desirable to run power, ground and status indication LED lines through the interface. It should be pointed out that to provide all the needed power to the physical layer module it is generally desirable to use multiple pins. Also, multiple ground lines should also be used to help prevent unwanted crosstalk. Specifically, by running multiple ground signals between critical signals crosstalk can be minimized.

When a 1394 connector is to be provided on the PCI card itself (in addition to those on the physical layer module), a 1394 data line is also run from the physical layer module through the releasable connector 206 and back to the PCI card. As discussed above, this provides an internal 1394 connector that can be used to connect the two 1394 nodes together for testing.

Also included through the releasable connector 206 is a connection between the link layer chip and the EEPROM2 on the physical device interface module. In summary, table 1 illustrates the signals running through the modular interface for a IEEE 1394 implementation in the preferred embodiment for a 1394 test bus.

TABLE 1

| SIGNAL | CLASS | DESCRIPTION |
| --- | --- | --- |
| DATA [1–8] | PHY-LINK | Data Signals |
| LREQ | PHY-LINK | Link Request Signal |
| SCLK | PHY-LINK | 49.152 MHZ Clock |
| LINK_ON | PHY-LINK | Link On Signal |
| CTRL0 | PHY-LINK | Control Signal |
| CTRL1 | PHY-LINK | Control Signal |
| PHY_LPS | PHY-LINK | Link Power status signal |
| PHY OUT [1–4] | 1394 CABLE | 1394 Output Signal Pairs |
| CABLE_POWER [1–2] | 1394 CABLE | 1394 Cable Power |
| GROUND [1–8] | POWER/GROUND | Ground |
| PHY_VSET [1–2] | POWER/GROUND | Module Detection Signal |
| PHY_POWER [1–2] | POWER/GROUND | PHY Power |
| EEPROM_DATA | PHY Module Control | Data Signal |
| EEPROM_CLOCK | PHY Module Control | EEPROM Clock |
| PHY_CD [1–2] | PHY Module Control | PHY Module Detection |
| LED | PHY Module Control | LED Signal |

Figure 4:
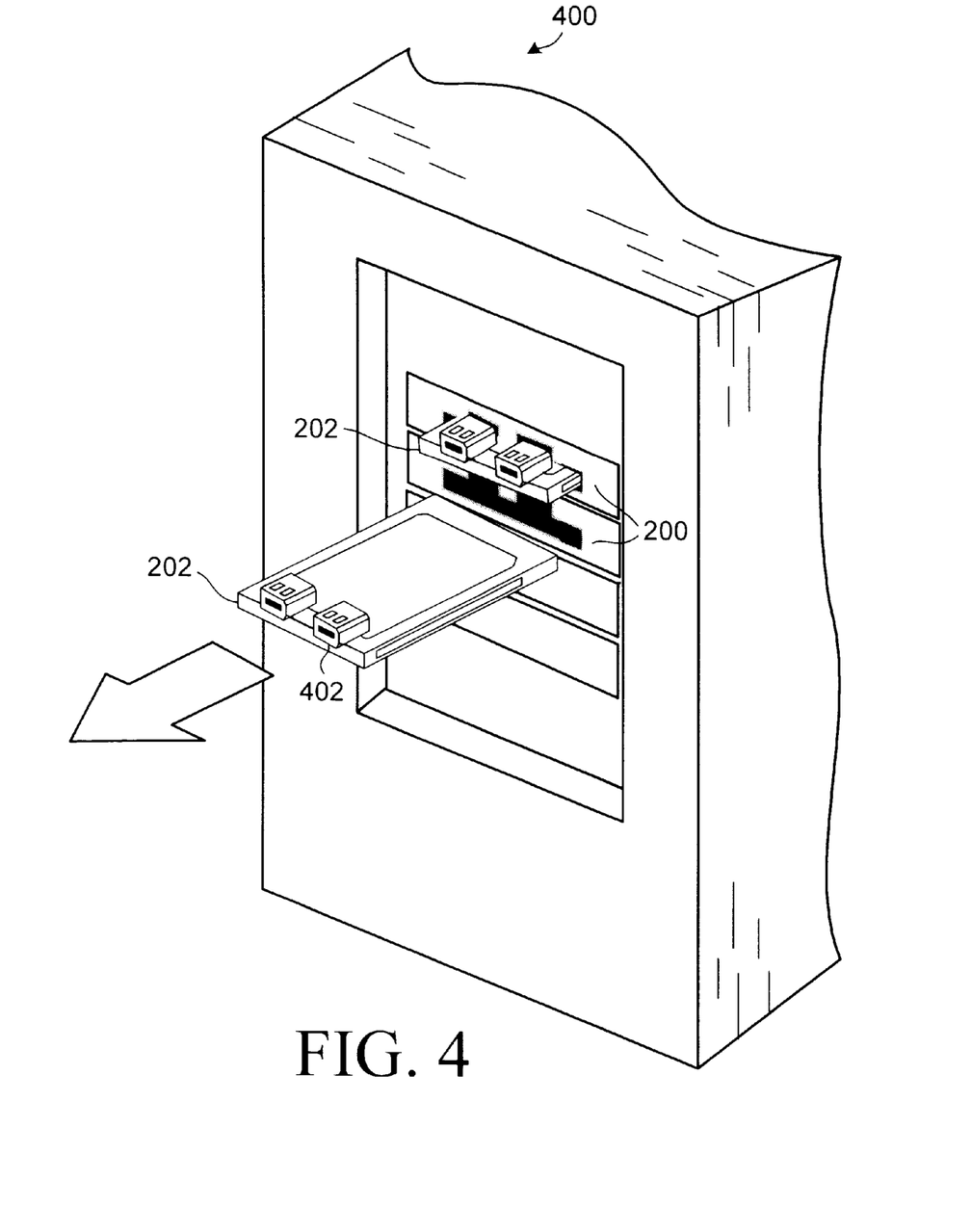
FIG. 4 is an isometric view of a portion of a data analyzer in accordance with the preferred embodiment.

Turning now to FIG. 4, a portion of a data analyzer 400 that includes two modular bus interfaces 200 is illustrated. Each modular bus interface 200 accepts a physical layer module 202. In this illustrated embodiment, the modular bus interfaces 200 are implemented on PCI expansion cards, and the physical layer module 202 is implemented using a PC Card type form factor. Again, this allows physical interface modules 202 to be easily swapped. Each physical interface module 202 includes PC Card type releasable connector used to connect with the modular bus interface 200. Additionally, in the illustrated embodiment, each physical layer module 202 includes two 1394 type connectors 402, used to connect to other 1394 devices for testing.

Thus, in the preferred embodiment of the present invention a modular interface is used to provide a modular connection between physical layer and link layer devices. By providing such an modular bus interface, the embodiment of the present invention provides a data analyzer with increased flexibility over prior art designs. The modular bus interface allows physical layer devices to be easily swapped, allowing a wide variety of link layer and physical layer device combinations to be tested while minimizing system downtime. This allows developers to test their devices, such as a cameras, TVs, scanners, etc., with as many different bus implementations as possible, including combinations that may not be readily available, to assure consistent operation, without requiring many different adapter cards or even more costly custom designs. Furthermore, this avoids having to reconfigure the data analyzer and reduces system downtime. The preferred embodiment can also be used to facilitate more complex testing scenarios where the tested device communicates with multiple nodes of having different implementation chip combinations.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications are possible in light of the above teaching without departing from the spirit and scope of the forthcoming claims.

What is claimed is:

1. A modular bus interface for use in a bus data analyzer, the modular bus interface comprising:
   an expansion card, the expansion card providing an interface to the bus data analyzer;
   a link layer module mounted on the expansion card, the link layer module including a link layer device for implementing a test bus;
   a physical layer module including a physical layer device for implementing the test bus, at least one test bus connector, and a memory device for storing physical layer device identification data; and
   a releasable connector, the releasable connector providing electrical and mechanical connection between the link layer module and the physical layer module, the releasable connector providing:
      i) connection for data and control signals between the physical layer device and the link layer device;
      ii) connection for power to the physical layer device; and
      iii) connection between the memory device and the link layer device;
   and wherein the releasable connector allows the physical layer module to be removed and replaced with another physical layer module as needed to test different test bus implementations.

2. The modular bus interface of claim 1 wherein the physical layer device comprises an IEEE 1394 PHY chip, the link layer device comprises an IEEE 1394 link layer chip and the at least one test bus connector comprises an IEEE 1394 connector.

3. The modular bus interface of claim 1 wherein expansion card comprises a PCI expansion card.

4. The modular bus interface of claim 1 wherein the physical layer module comprises a PC Card type card and wherein the releasable connector comprises a PC Card type socket connector.

5. The modular bus interface of claim 1 wherein the link layer module further includes a test bus connector and wherein the releasable connector further provides a connection between an output of the physical layer device and the test bus connector on the link layer module.

6. The modular bus interface of claim 1 wherein the link layer module includes a memory device storing an encryption key for authenticating the physical layer device.

7. An apparatus comprising:
   a) at least one processor;
   b) a memory coupled to the at least one processor;
   c) a system bus coupled to the at least one processor;
   d) a data analyzer program residing in the memory; and
   e) a modular bus interface coupled to the system bus, the modular bus interface implementing a test bus for use by the data analyzer program, the modular bus interface including:
      a link layer module, the link layer module having a link layer device for implementing the test bus;
      a physical layer module having a physical layer device for implementing the test bus; and
      a releasable connector, the releasable connector providing electrical and mechanical connection between the link layer module and the physical layer module such that the physical layer module can be removed and replaced with another physical layer module as needed to test different test bus implementations.

8. The apparatus of claim 7 wherein the physical layer module comprises a PC Card type card and wherein the releasable connector comprises a PC Card type socket.

9. The apparatus of claim 7 wherein the link layer module is mounted on an expansion card for connecting to the system bus.

10. The apparatus of claim 7 wherein the physical layer device comprises an IEEE 1394 PHY chip, and wherein the link layer device comprises an IEEE 1394 link layer chip.

11. The apparatus of claim 10 wherein the IEEE 1394 link layer chip includes a PCI controller.

12. The apparatus of claim 7 wherein the physical layer module includes at least one bus connector to connect to the test bus.

13. The apparatus of claim 7 wherein physical layer module includes at least one memory device for storing physical layer device identification data.

14. The apparatus of claim 7 wherein the releasable connector provides electrical connection between the memory device and the link layer device.

15. The apparatus of claim 7 wherein link layer module includes a memory device storing an encryption key for authenticating the physical layer device.

16. The apparatus of claim 7 wherein the releasable connector provides a connection between the link layer device and the physical layer device for data and control signals.

17. The apparatus of claim 7 wherein the link layer module includes a test bus connector and wherein the releasable connector provides a connection between an output of the physical layer device the test bus connector on the link layer module.

18. A modular bus interface for use in a bus data analyzer, the modular bus interface comprising:
   a link layer module, the link layer module having a link layer device for implementing a test bus;
   a physical layer module having a physical layer device for implementing the test bus; and
   a releasable connector, the releasable connector providing electrical and mechanical connection between the link layer module and the physical layer module such that the physical layer module can be removed and replaced with another physical layer module as needed to test different test bus implementations.

19. The modular bus interface of claim 1 wherein the releasable connector comprises a PC Card type socket.

20. The modular bus interface of claim 1 wherein the physical layer module comprises a PC Card type device.

21. The modular bus interface of claim 1 wherein the link layer module is mounted on an expansion card.

22. The modular bus interface of claim 21 wherein the expansion card comprises a PCI expansion card.

23. The modular bus interface of claim 1 wherein the physical layer device comprises an IEEE 1394 PHY chip, and wherein the link layer device comprises an IEEE 1394 link layer chip.

24. The modular bus interface of claim 23 wherein the IEEE 1394 link layer chip includes a PCI controller.

25. The modular bus interface of claim 1 wherein the physical layer module includes at least one bus connector to connect to the test bus.

26. The modular bus interface of claim 25 wherein the at least one bus connector comprises an IEEE 1394 connector.

27. The modular bus interface of claim 25 wherein the releasable connector provides a connection providing power to the physical layer device and to the at least one test bus connector.

28. The modular bus interface of claim 1 wherein physical layer module includes at least one memory device for storing physical layer device identification data.

29. The modular bus interface of claim 28 wherein the releasable connector provides electrical connection between the memory device and the link layer device.

30. The modular bus interface of claim 28 wherein the link layer module includes a memory device storing an encryption key for authenticating the physical layer device.

31. The modular bus interface of claim 1 wherein the releasable connector provides a connection between the link layer device and the physical layer device for data and control signals.

32. The modular bus interface of claim 1 wherein the link layer module includes a test bus connector and wherein the releasable connector provides a connection between an output of the physical layer device and the test bus connector on the link layer module.

\* \* \* \* \*